United States Patent
Smith et al.

(10) Patent No.: US 6,526,415 B2
(45) Date of Patent: *Feb. 25, 2003

(54) METHOD AND APPARATUS FOR PRODUCING AN ACCESSING COMPOSITE DATA

(75) Inventors: Kurt R. Smith, Boulder, CO (US); Richard D. Bucholz, St. Louis, MO (US); Timothy J. Schaewe, Louisville, CO (US)

(73) Assignee: Surgical Navigation Technologies, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,144

(22) Filed: Jun. 11, 2001

(65) Prior Publication Data

US 2001/0029509 A1 Oct. 11, 2001

Related U.S. Application Data

(63) Continuation of application No. 09/382,594, filed on Aug. 25, 1999, now Pat. No. 6,253,210, which is a continuation of application No. 08/832,688, filed on Apr. 11, 1997, now Pat. No. 5,970,499.

(51) Int. Cl.$^7$ .............................................. G06F 17/30
(52) U.S. Cl. ...................................... 707/104.1; 704/7
(58) Field of Search ............................ 707/104.1; 704/7

(56) References Cited

U.S. PATENT DOCUMENTS

| | | |
|---|---|---|
| 4,644,582 A | 2/1987 | Morishita et al. |
| 4,722,056 A | 1/1988 | Roberts et al. |
| 4,879,668 A | 11/1989 | Cline et al. |
| 4,958,283 A | 9/1990 | Tawara et al. |
| 4,987,412 A | 1/1991 | Vaitekunas et al. |
| 5,005,126 A | 4/1991 | Haskin |
| 5,027,422 A | 6/1991 | Peregrim et al. |
| 5,048,103 A | 9/1991 | Laclerc et al. |
| 5,099,846 A | 3/1992 | Hardy |
| 5,241,472 A | 8/1993 | Gur et al. |
| 5,261,404 A | 11/1993 | Mick et al. |
| 5,272,625 A | 12/1993 | Nishihaa et al. |
| 5,274,551 A | 12/1993 | Corby, Jr. |
| 5,284,142 A | 2/1994 | Goble et al. |
| 5,291,104 A | 3/1994 | Robinson |
| 5,309,356 A | 5/1994 | Nishide et al. |
| 5,353,220 A | 10/1994 | Ito et al. |
| 5,368,030 A | 11/1994 | Zinreich et al. |

(List continued on next page.)

FOREIGN PATENT DOCUMENTS

| WO | WO9424933 | 11/1994 |
|---|---|---|
| WO | WO9611624 A2 | 7/1996 |

OTHER PUBLICATIONS

Davis et al., "Three–Dimensional High–Resolution Volume Rendering (HRVR) of Computed Tomography Data: Applicaitons to Otolaryngology–Head and Neck Surgery," Laryngoscope, Jun. 1991, pp. 573–582.

Rosenman et al., "Vistanet: Interactive Real–Time Calculation and Display of 3–Dimensional Radiation Dose: An Application of Gigabit Networking," International Journal of Radiation Oncology Biology, Physics, Jan. 1993, pp. 123–129.

(List continued on next page.)

*Primary Examiner*—Wayne Amsbury
(74) *Attorney, Agent, or Firm*—Senniger, Powers, Leavitt & Roedel

(57) ABSTRACT

An apparatus and method for producing composite data by a server computer involves deforming a template creating a mapping relationship between co-registered data and subject data, filtering the co-registered data, and mapping this filtered co-registered data according to the mapping data. A client computer requests the composite data from the server computer and transmits the subject data to the server computer. The client presents the received composite data to an operator and monitors the operators use of the composite data.

101 Claims, 7 Drawing Sheets

U.S. PATENT DOCUMENTS

| | | | |
|---|---|---|---|
| 5,383,454 A | 1/1995 | Bucholz | |
| 5,399,146 A | 3/1995 | Nowacki et al. | |
| 5,402,337 A | 3/1995 | Nishide | |
| 5,402,801 A | 4/1995 | Taylor | |
| 5,465,308 A | 11/1995 | Hutchenson et al. | |
| 5,483,606 A | 1/1996 | Denber | |
| 5,483,961 A | 1/1996 | Kelly et al. | |
| 5,490,221 A | 2/1996 | Ransford et al. | |
| 5,531,227 A | 7/1996 | Schneider | |
| 5,531,520 A | 7/1996 | Grimson et al. | |
| 5,550,021 A | * 8/1996 | Blum et al. | 435/6 |
| 5,550,971 A | * 8/1996 | Brunner et al. | 345/762 |
| 5,568,384 A | 10/1996 | Robb et al. | |
| 5,568,809 A | 10/1996 | Ben-haim | |
| 5,572,999 A | 11/1996 | Funda et al. | |
| 5,581,638 A | 12/1996 | Givens et al. | |
| 5,588,430 A | 12/1996 | Bova et al. | |
| 5,619,708 A | * 4/1997 | Ho | 358/453 |
| 5,630,431 A | 5/1997 | Taylor | |
| 5,633,951 A | 5/1997 | Moshfeghi | |
| 5,659,793 A | 8/1997 | Escobar et al. | |
| 5,676,673 A | 10/1997 | Ferre et al. | |
| 5,695,500 A | 12/1997 | Taylor et al. | |
| 5,695,501 A | 12/1997 | Carol et al. | |
| 5,704,371 A | 1/1998 | Shepard | |
| 5,711,299 A | 1/1998 | Manwaring et al. | |
| 5,740,274 A | 4/1998 | Ono et al. | |
| 5,747,362 A | 5/1998 | Funda et al. | |
| 5,747,767 A | 5/1998 | Raab | |
| 5,755,725 A | 5/1998 | Druais | |
| 5,772,594 A | 6/1998 | Barrick | |
| 5,794,237 A | * 8/1998 | Gore, Jr. | 704/7 |
| 5,795,294 A | 8/1998 | Luber et al. | |
| 5,799,055 A | 8/1998 | Peskin et al. | |
| 5,800,535 A | 9/1998 | Howard, III | |
| 5,809,497 A | * 9/1998 | Freund et al. | 707/2 |
| 5,823,958 A | 10/1998 | Truppe | |
| 5,826,102 A | 10/1998 | Excobar et al. | |
| 5,826,237 A | 10/1998 | Macrae et al. | |
| 5,833,608 A | 11/1998 | Acker | |
| 5,834,759 A | 11/1998 | Glossop | |
| 5,836,954 A | 11/1998 | Heilbrun et al. | |
| 5,838,906 A | * 11/1998 | Doyle et al. | 345/738 |
| 5,848,967 A | 12/1998 | Cosman | |
| 5,851,183 A | 12/1998 | Bucholz | |
| 5,862,260 A | * 1/1999 | Rhoads | 382/232 |
| 5,868,675 A | 2/1999 | Henrion et al. | |
| 5,871,445 A | 2/1999 | Bucholz | |
| 5,871,487 A | 2/1999 | Warner et al. | |
| 5,884,298 A | 3/1999 | Smith, Jr. et al. | |
| 5,891,034 A | 4/1999 | Bucholz | |
| 5,891,157 A | 4/1999 | Day et al. | |
| 5,904,691 A | 5/1999 | Barnett et al. | |
| 5,913,685 A | * 6/1999 | Hutchins | 434/265 |
| 5,915,250 A | 6/1999 | Jain et al. | |
| 5,920,395 A | 7/1999 | Schulz | |
| 5,920,870 A | 7/1999 | Briscoe et al. | |
| 5,921,992 A | 7/1999 | Costales et al. | |
| 5,954,664 A | 9/1999 | Seegobin | |
| 5,970,499 A | * 10/1999 | Smith et al. | 707/102 |
| 5,997,476 A | 12/1999 | Brown | |
| 6,003,007 A | 12/1999 | DiRenzo | |
| 6,009,212 A | 12/1999 | Miller et al. | |
| 6,083,163 A | * 7/2000 | Wegner et al. | 600/429 |
| 6,091,930 A | * 7/2000 | Mortimer et al. | 434/118 |
| 6,253,210 B1 | * 6/2001 | Smith et al. | 707/104 |

OTHER PUBLICATIONS

Heinz et al., "Examination of the Extracranial Carotid Bifurcation by Thin–Section Dynamic Ct: Direct Visualization of Intimal Atheroma in Man (Part 1)," American Journal of Neuroradiology, Jul./Aug. 1984, p. 355–359.

The Dynasight ™ Sensor; A precision Optical Radar. High–Performance Machine Vision for the VMEbus.

"The Future of Medicine," The Economist, pp. 1–18.

Hatch, Reference Display System for the Integration of CT Scanning and the Operating Microscope, Master of Engineering Thesis, Dartmuth College, Hanover, NH, Oct. 1984.

Christensen et al., "Individualizing Neuro–Anatomical Atlases Using a Massively Parallel Computer," IEEE, 1996.

Galvin et al, "Image Corner, The Virtual Hospital, Providing Multimedia Decision Support Tools Via the Internet," Spine, vol. 20, No. 15, p. 1735–1738, 1995.

"The Novel Hypermedia System for UNIX Workstations, VOXEL–MAN," Institute of Mathematics and Computer Science.

"The Electronic Clinical Brain Atlas: Three–Dimensional Navigation of the Human Brain," Thieme, Apr. 1996.

Perry et al., "Emission and Transmission Spect Data Combination in Interactive 3D Image Presentation," The Journal of Nuclear Medicine, May 1989, p. 835.

Tsui et al, "Three–Dimensional Display Methods for Image Data Obtained with Spect," European Journal of Nuclear Medicine, Aug. 1989, p. 639.

Penn et al., "Stereotactic Surgery with Image Processing of Computerized Tomographic Scans," Neurosurgery, vol. 3, No. 2, 1978, pp. 157–163.

Rosenman, et al., "Three–Dimensional Display Techniques in Radiatiion Therapy Treatment Planning," International Journal of Radiation oncology Biology, Physics, Jan. 1989, pp. 263–269.

Pelizzari, "Accurate Three Dimensional Registration of CT, PET, and/or MR Images of the Brain," Journal of Computer Assisted Tomography, vol. 13, No. 1, pp. 20–26 Jan./Feb. 1989.

Gramkow, "Registration of 2D and 3D Medical Images," Lyngby, IMM–EKS–1996–1, Jan. 1996.

Amit, "Graphical Shape Templates for Deformable Model Registration," University of Chicago Bio Fund, ARO DAAL03 92 G 0322, pp. 1–18.

PCT International Search Report Nov. 14, 1997.

Stevens, "TCP/IP Illustrated," vol. 3, Addison Wesley Publishing Co., 1996.

Siyan, "Inside TCP/IP," 3d Edition, New Riders Publishing, 1997.

Jini Connection Technology Specification, May 1999, found at ww.sun.com/jini.

Lavallee et al., "Matching of Medical Images for Computed and Robot Assisted Surgery," TIMB–TIM3–IMAG, Faculte de Medicine de Grenoble.

Kaufman et al., "New Head–Positioning System for Use with Computed Tomographic Scanning," Neurosurgery, vol. 7, No. 2, pp. 147–149, 1980.

Bajesy et al., Abstract, pp. 435–441, 1981.

Batnitzky et al, "Three–Dimensional Computer Reconstructions of Brian Lesions from Surface Contours Provided by Computed Tomography: A Prospectus," Neurosurgery, vol. 11, No. 1, Part 1, pp. 73–84, 1982.

Kelly et al., "Precision Resection of Intra–Axial CNS Lesions by CT–Based Sterotactic Craniotomy and Computer Monitored $CO_2$ Laser," Acta Neurochirurgica, 68, pp. 1–9, 1983.

Foley et al., "Fundamentals of Interactive Computer Graphics".

* cited by examiner

METHOD AND APPARATUS FOR PRODUCING AN ACCESSING COMPOSITE DATA

This application is a continuation of Ser. No. 09/382,594, filed Aug. 25, 1999, issued as U.S. Pat. No. 6,253,210, which is a continuation of patent application Ser. No. 08/832,688, filed Apr. 11, 1997, issued as U.S. Pat. No. 5,970,499

BACKGROUND OF THE INVENTION

The present invention relates to information systems and methods, and more particularly to data fusion systems.

Many applications require the contemporaneous assimilation of large amounts of data Medical, military, and commercial applications require operators to engage in procedures and make decisions based on data describing various subjects represented by, for example, images, recorded sound, and text. Current technology does not present personnel with a unified view of this subject data to allow then to use all available data to make informed decisions.

For example, a physician providing medical treatment, reviews image data acquired in multiple modalities, such as magnetic resonance ("MR"), computed tomographic ("CT"), and X-ray images, medical journals describing procedures, video images, such as ultrasound, and atlases describing anatomical structures. A physician must therefore consult several sources to review the data necessary to provide patient treatment. These sources may include multiple computer display terminals located in different parts of a hospital, hard copies of medical images printed on film archived among thousands of images in a hospital film library or remote storage site, and volumes of journals located in the stacks of a hospital library. Also, the sources of data consulted by treating physicians may include medical atlases containing thousands of MR and CT scans of a cadaver corresponding to photographic images of cross-sectional slices taken of various anatomical structures.

Usually data from these atlases and other sources are not correlated with each other. A cadaver image in an atlas does not usually have the same geometry as a patient receiving treatment, so a physician must mentally fuse the available data which requires correlating the data retrieved from the various sources to develop a treatment plan or to provide information during medical procedures. The difficulties of fusing all of the available data increase if the physician must assimilate the various data types while rendering treatment.

The World Wide Web ("WWW") has recently made vast amounts of data stored on local and remote computers easily accessible through a graphical computer interface. The WWW is a network of computers, connected by the Internet, sharing a common file structure and mark-up language for creating files. The two most prevalent languages used to create multimedia WWW files are the hypertext mark-up language ("HTML") and the virtual reality mark-up language ("VRML"). HTML is best suited for creating files with text and two-dimensional image data, whereas VRML is designed for creating files containing images of three-dimensional objects. Both languages provide an easy way to combine image, text, and sound data in files accessible by "point-and-click," computer mouse driven user interfaces called "browsers."

A "browser" is a computer program that provides users access to files stored on the WWW. The browser displays files on a computer screen and can run programs, known as "applets," indicating links to data in other files on the WWW by, for example, underlining text or highlighting areas of an image. By selecting the underlined text or a highlighted image, the browser retrieves the linked data, allowing a user to view data stored on computers in the WWW without needing to know where the information is physically stored. Files can be joined using these "hyperlinks," which give the name of the file along with an address for a computer storing the file. For example, the text or an image in a file stored on a computer in Switzerland can contain an embedded link to data stored on a computer in the United States. The WWW browser automatically recognizes the linked file data type, so the linked file can be an image, an audio clip, a video, or even an executable computer program. For example, if the linked data is an audio clip, the browser will load a program that takes the audio clip and plays it through the speakers of the user's computer. A browser usually runs on a computer referred to as a "client," while a computer known as a "server" hosts and produces WWW files requested by a client.

In particular, the WWW serves as a useful tool for navigating through two- and three-dimensional image data. For example, an image can be displayed by the browser, and different parts of the image can be linked to different files. But, for the most part, this WWW capability is primarily used for providing simple menus of uncorrelated data available on WWW computers. For example, a WWW computer will show an image of people, cars, and boats. By clicking on the image of people, a user can go to on-line chat sessions with people, or by clicking on a boat image, a user gets information about boats.

The current technology is limited because there does not exist an information system that exploits the data navigation capabilities of the WWW to correlate data retrieved from diverse sources and then assimilate the data into a useful form. For example, the tools available for information gathering in the WWW environment include database search engines and expert systems that assist a user in describing the information sought. However, these tools only retrieve files corresponding to a particular term or pertaining to certain designated subject matter. The retrieved files are not correlated with one another.

There is, therefore, a need for an information system that harnesses the power of the technology associated with the WWW and other similar image-based information retrieval systems to produce assimilate composite data in a form that operators can readily use.

SUMMARY OF THE INVENTION

The present invention is directed to a method and apparatus for producing and accessing composite data containing co-registered and subject data. The method for automatically producing composite data includes several steps, performed by a server computer. The steps include: creating a mapping relationship between the co-registered data and the subject data by mapping or deforming a template to fit the subject data; filtering the co-registered data; and producing composite data by mapping the filtered co-registered data to the subject data according to the mapping relationship.

A method consistent with this invention is also directed to steps, performed in a client computer, including: requesting composite data from a server, computer; transmitting the subject data to the server computer; receiving the requested composite data from the server computer; presenting the received composite data to an operator; and monitoring the operator's use of composite data.

An apparatus consistent with this invention for automatically producing composite data containing co-registered data and subject data includes: structure for creating a mapping relationship between the co-registered data and the subject data by mapping or deforming a template to fit the subject data; structure for filtering the co-registered data; and structure for producing composite data by mapping the filtered co-registered data to the subject data according to the mapping relationship.

Another apparatus consistent with the present invention automatically presents an operator with composite data containing co-registered data and subject data. Such an apparatus includes: structure for requesting composite data from a server computer; structure for transmitting the subject data to the server computer; structure for receiving the requested composite data from the server computer; structure for presenting the received composite data to an operator; and structure for monitoring the operator's use of the received composite data.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principled of the invention.

DETAILED DESCRIPTION OF THE INVENTION

Reference will now be made in detail to the preferred embodiments of this invention, examples of which are illustrated in the accompanying drawings.

Figure 1:
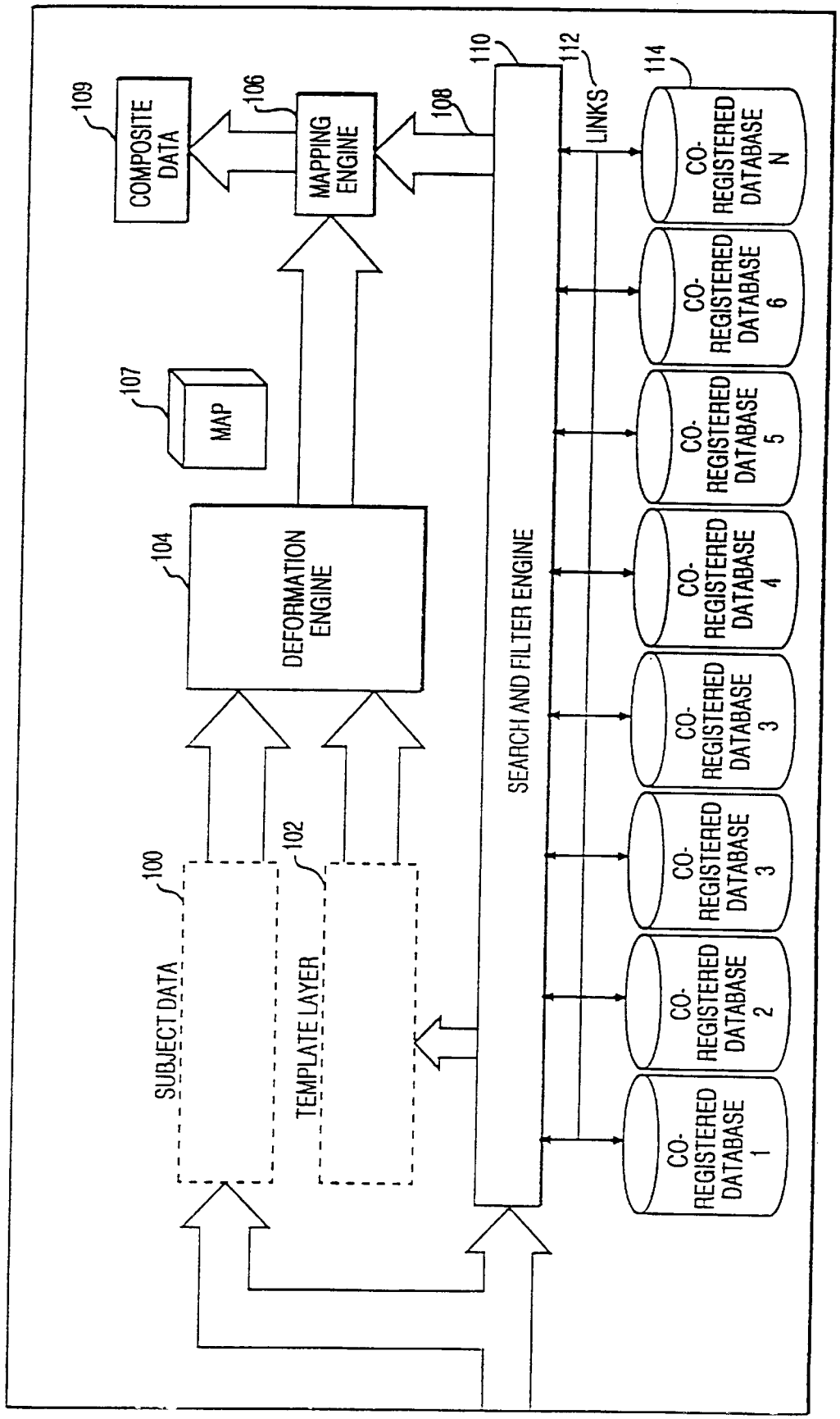
FIG. 1 is a block diagram of an apparatus for automatically producing composite data containing co-registered data and subject data consistent with the present invention.

To illustrate the principles of this invention, FIG. 1 shows subject data 100, template layer 102, deformation engine 104, mapping engine 106, map 107, filtered, co-registered data 108, search and filter engine 110, links 112, and co-registered databases 114. The term "layer" denotes a grouping of data types represented in, for example, a database on a server computer. To produce composite data 109, deformation engine 104 deforms a template layer 102 to fit subject data 100 generating map 107. When subject data 100 is multi-modal, multiple template layers can be utilized to correlate co-registered data 114 to subject data 100 as well as to correlate multi-modal subject data 100 to itself. A template layer contains reference data locations, or landmarks, used to correlate template data with elements of subject data. Examples of landmarks include data representing points, lines, surfaces, volumes, or other defining features in image data.

Generally, deformation is the process of mapping one image to another image where both images represent the same structure but have different geometric proportions and orientations. During deformation, mathematical transforms are applied to the images that perform the equivalent of bending, stretching, and rotating template data to match subject data. For example, after deformation, template data in the form of a volume image of a generalized model of the human brain is manipulated so that the anatomical structure in this model has the same size, shape, and orientation as the subject data, the actual anatomy of a patient receiving treatment. There are many techniques available for automatically deforming one set of data to fit a target data set, including rule-based morphology, correlation of selected landmarks in each data set, and a technique fusing selected landmarks and image data. One example of such technique appears in U.S. patent application Ser. No. 08/678,628 filed Jul. 10, 1996, now U.S. Pat. No. 6,009,212, which is herein incorporated by reference.

Once template layer 102 is deformed to fit subject data 100, a mapping relationship, map 107, is established whereby mapping engine 106 maps co-registered data 114 to subject data 100 producing composite data 109. Co-registered data 114 represents a knowledge base providing supplemental information about structures contained in subject data 100. The co-registered databases and template layer share a common coordinate system, so a data element representing a position in one co-registered database is correlated with a data element representing that same position in each of the other co-registered databases. In an embodiment consistent with the present invention, co-registered data 114 is co-registered using, for example, the deformation techniques described above. The mapping relationship obtained from deforming template layer 102 to fit subject data 100 correlates the co-registered database coordinate system with a subject data coordinate system. Implementing this mapping relationship, mapping engine 106 relates points in the subject data coordinate system to corresponding points in the co-registered database coordinate system, providing a dynamic connection between subject data 100 and co-registered databases 114.

Search and filter engine 110 controls which elements of co-registered data 114 are mapped to subject data 100 and presented to an operator. Search and filter engine 110 can allow mapping engine 106 to map all of a subset of co-registered data 114 to subject data 100. Links 112 specify relationships among data elements across co-registered databases 114 which are used by search and filter engine 110 to assimilate co-registered data according to a service request by an operator including, for example, an indication of a region or regions of interest in subject data 100. The links 112 may be formed using an appropriate database indexing strategy to assign key-word or concept search tags to associated data elements.

Figure 2:
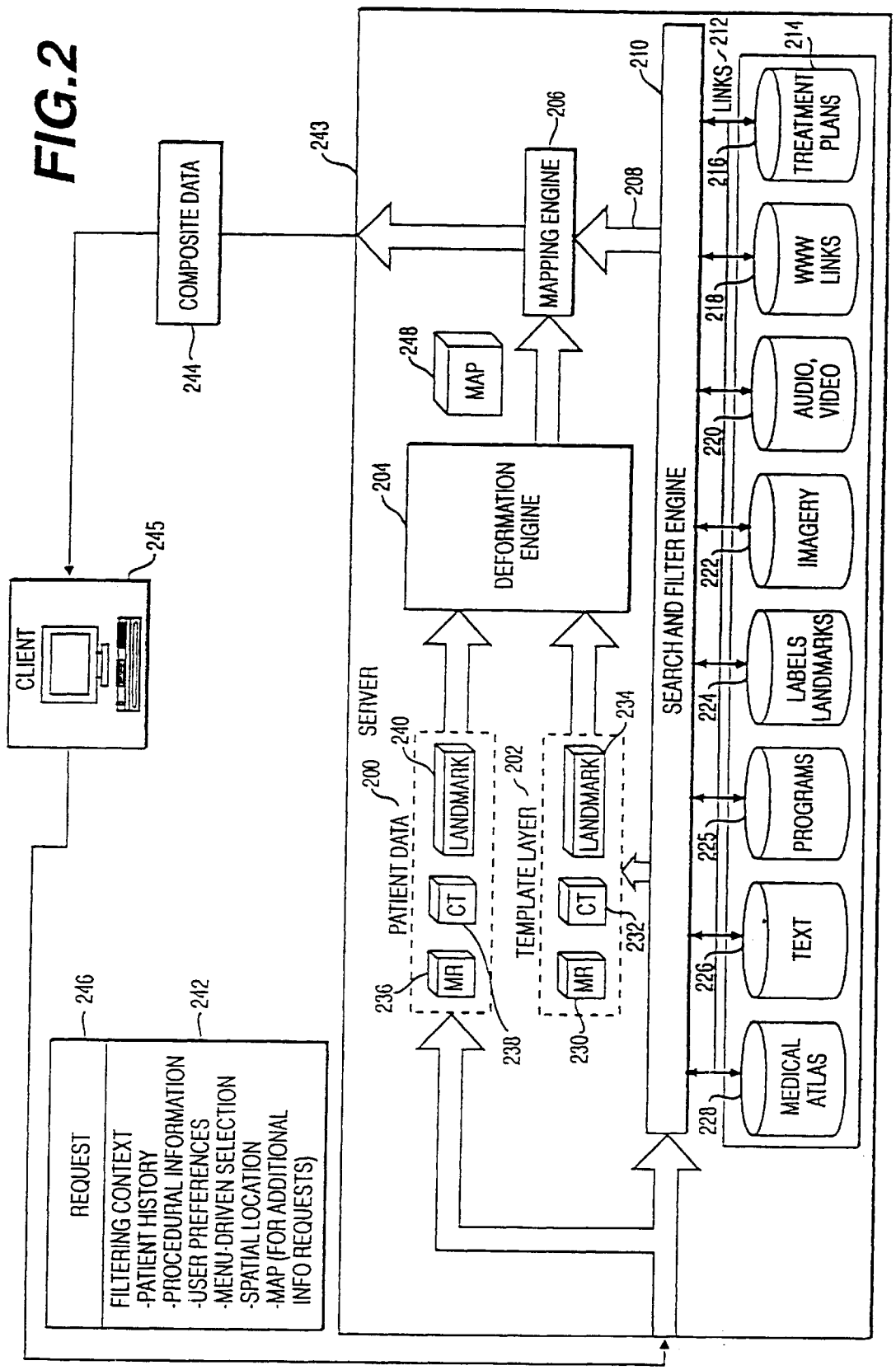
FIG. 2 is a block diagram of another apparatus for automatically producing composite medical data containing co-registered medical data and patient data consistent with the present invention.

FIG. 2 shows a preferred embodiment of the present invention for producing composite patient data for medical treatment. Collected patient data 200, includes, for example, MR image 236, CT image 238, and landmarks 240. Template layer 202 includes corresponding MR image 230, CT image 232, and landmark 234 templates. This embodiment also includes a deformation engine 204, mapping engine 206, search and filter engine 210, links 212, and co-registered data 214.

Co-registered data 214 includes a medical atlas 228, text 226, computer programs 225 (such as applets), labels and landmarks 224, images 222, audio and video clips 220, links to computers located on the WWW 218, and treatment plans 216. Co-registered data can also include co-registered subject data. The forgoing list of co-registered data types is only provided as an example of the types of data that are useful in practicing this invention in the context of providing medical treatment. Persons of ordinary skill will recognize that many other data types may also be useful. One of ordinary skill in the art will also recognize that two or more of the co-registered data types may reside in a single database.

Figure 3:
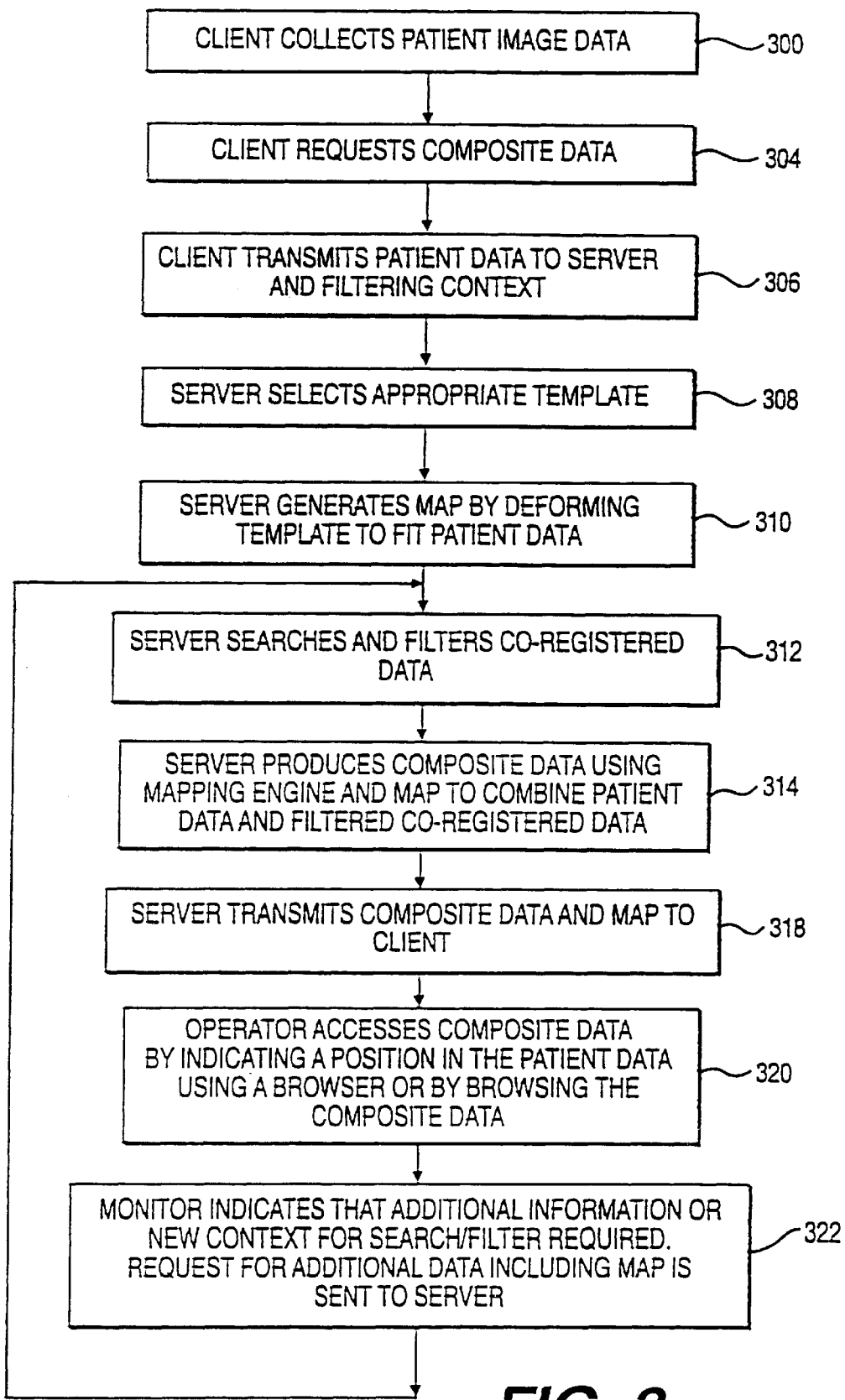
FIG. 3 is flow diagram of a method for automatically producing composite data containing co-registered data and subject data consistent with the present invention.

FIG. 3 is a flow diagram of a method for producing composite medical data consistent with the invention. An operator of a system consistent with this invention wishing to have composite data for medical treatment first identifies and possibly collects patient data 200 using a client computer (step 300). The collected patient data must have a modality (e.g., CT, MR, or X-ray) and protocol (e.g., slice thickness and resolution) that is compatible with a template in template layer 202.

The client computer then generates request 246 for composite data 244 (step 304). Request 246 includes, for example, an operator identifier, security screening information, and treatment information. The client computer also transmits or enables transmission of (from a radiological database, for example) collected patient data 200 and associated filtering content 242 to the server computer (step 306).

Responding to client computer request 246 for composite data 244, the server computer selects a template conforming with this request (step 308). Example template, MR 230, employed by the present invention when used for medical treatment includes a three-dimensional MR scan of the same slice thickness, resolution, and collection protocol as the patient MR dataset 236. Associated with the selected template imagery is a set of landmarks 234 identifying anatomical structure in a region of interest for a particular surgical procedure. Next, deformation engine 204 fits the selected template to patient data received from the client computer. The process of deforming the selected template to fit the patient data 200 creates a mapping relationship (map 248) relating template data space to a patient data space coordinate system (step 310). Mapping engine 206 also uses map 248 to relate a point in the patient data space coordinate system to an element of co-registered data 214. Once the mapping relationship is determined by deforming the selected template, all co-registered data 214 can be mapped to patient data 200. Note that if multi-modal patient data is used with multiple corresponding templates, multiple maps 248 can be constructed that can then be used to correlate the multi-modal patient data with each other in addition to correlating co-registered data 214.

Search and filter engine 210 controls how much of co-registered data 214 is included in the composite data. One reason for such control is that certain data types and/or data elements in co-registered data 214 may not be relevant for some medical treatment. Search and filter engine 210 responds to filtering context 242 and selects co-registered data elements as appropriate for this filtering context (step 312) using links 212 to identify related data elements. The filtering context can be derived from data providing by the client computer during the initial request for composite data (step 304). A filtering context can also be derived from previously stored profiles or histories. The server then produces composite data using mapping engine 206 and map 248 to combine patient data and filtered, co-registered data (step 314), producing composite data 244. The server then transmits composite data 244 and map 248 to the client computer for presentation to an operator (step 318). The operator navigates the composite data by specifying a region of interest in the patient data using a browser interface (step 320). The operator may also use the browser interface to select highlighted text or other specified segments of the composite data, activating a link to a particular region of interest in the patient data.

Map 248 also allows an operator to access additional composite data (step 322). The server receives a request for additional co-registered data and preferably an associated position in the patient data coordinates from the client and subsequently retrieves and transmits additional co-registered data using mapping engine 206, map 248, search and filter engine 210, and links 212 to additional co-registered data 214. (repetition of steps 312–320).

An embodiment consistent with the present invention for use in the medical field links a radiologist's report to radiological imagery of a patient. Preferably, in an area of the radiologist's text report stating, for example, "in the left parietal-occipital region is a 1.2 cm hypodense lesion with an irregular border that does not enhance on contrast but is hyperintense of T2 . . . ", selecting the highlighted word "lesion" activates a link to the patient imagery which highlights the particular sub-region discussed in the report text. Likewise, if the operator selects the lesion site in the displayed patient imagery, the link will be activated to display the section or sections of the text report that discuss the selected region of interest.

Although the foregoing description of embodiments of the present invention specifically allocate certain operations to client and server computers, one of ordinary skill in that art will recognize that the distribution of specific tasks between client and server computers can vary based on application requirements. Moreover, embodiments of the present invention with several client or server computers are within the scope of this invention. Furthermore, it is also consistent with the present invention that the client and server tasks can be performed in a single computer.

In a preferred embodiment of the present invention, a graphical user interface designed for browsing data presents composite data 244 to the operator. The interface is preferably executed on networked computers. Computer program code that can be adapted to perform this browsing function includes Internet browsers designed to navigate the WWW, such as Netscape's Navigator and Microsoft's Explorer, and equivalent program that support links to data stored on networked computers.

Figure 4:
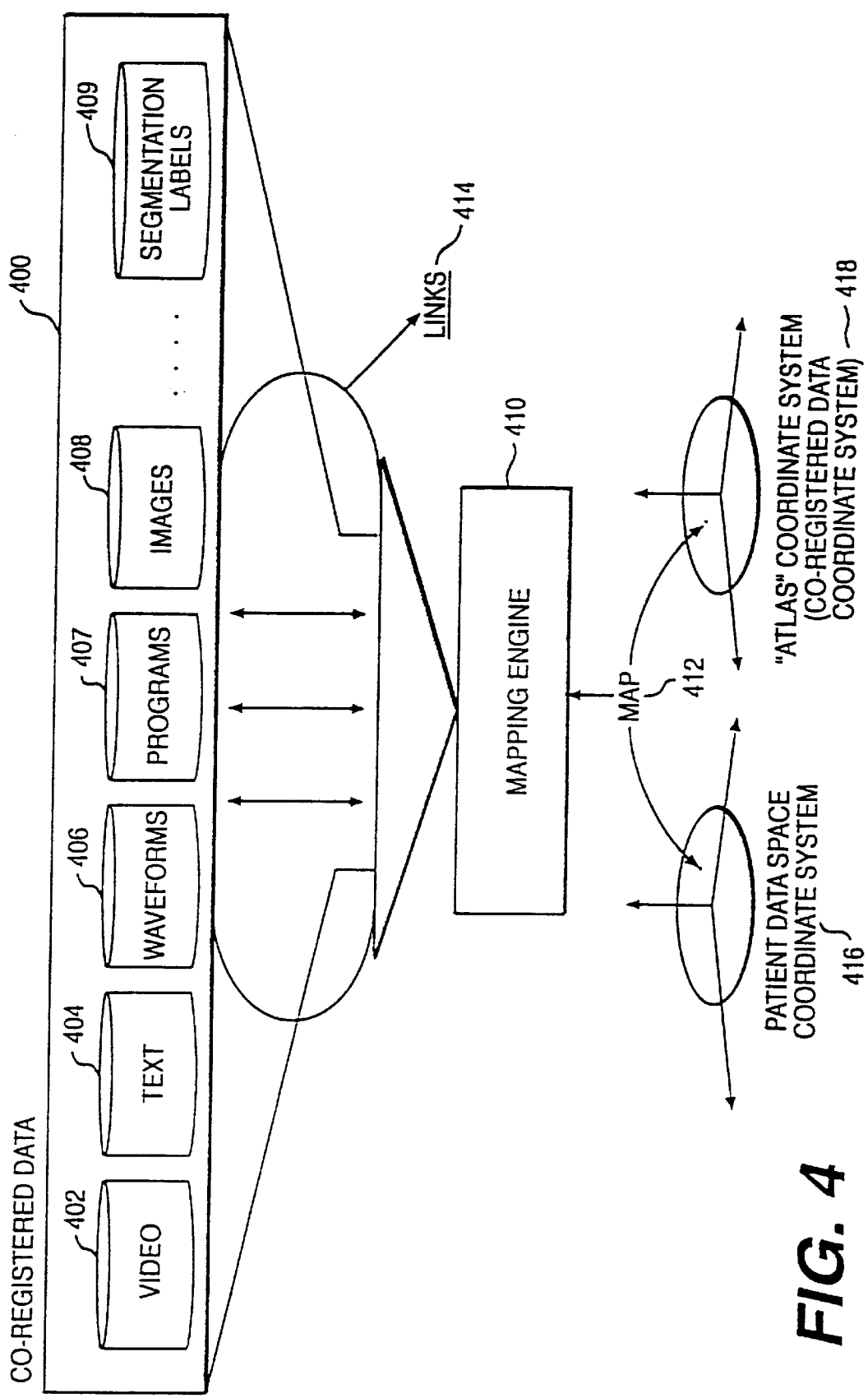
FIG. 4 is a schematic diagram of user interaction with the embodiment of the invention shown in the block diagram of FIG. 2.

FIG. 4 illustrates operator instruction associated with producing composite data in accordance with an embodiment of the present invention. FIG. 4 shows a database containing co-registered data 400 of several data types, including video 402, text 404, waveforms 406, programs 407, still images 408, and segmentation labels 409; a mapping engine 410; a map 412; a set of links 414 among associated data elements across and within the co-registered databases; a patient data space coordinate system 416; and a universal ("atlas") coordinate system 418 common to all data stored in co-registered database 400. A physician using this embodiment of the present invention selects any point in patient data space coordinate system 416 to retrieve co-registered data 400 corresponding to the selected point.

In an example illustrating co-registered data in one embodiment of the invention, still image database 408 contains MR images of a human head, database 406 contains recordings of waveforms produced by certain electrical signals in the brain, video database 402 contains recorded motion picture images of neurosurgical procedures or tutorials for these procedures, text database 404 contains short descriptive paragraphs or full journal articles describing regions of the brain and related surgical plans, database 407 contains programs for processing image data, and database 409 contains segmentation maps outlining brain structures.

The patient data space coordinate system 416 is a frame of reference for patient specific data. This coordinate system is provided by, for example, an MRI of a patient's head or the surgical field surrounding the patient during operation. Deformation engine 204 computes a mapping relationship relating template layer data points in atlas coordinate system 418 to patient data points in patient data space coordinate system 416. Mapping engine 410 uses this computed mapping relationship to transform co-registered data 400 mapped to atlas coordinate system 418 to patient data space coordinate system 416.

After mapping, a physician has available during a surgical procedure composite data adapted to the patient's anatomy. This composite data is a representation of (1) a patient's anatomy comprising patient specific data acquired before or during a medical procedure, and (2) data from one or more of the co-registered databases 400.

Map 412 provides a virtual grid overlaying the patient data space coordinate system 416 allowing an operator to position a pointing device in the patient data to retrieve co-registered data. Selecting a position in map 412 retrieves co-registered data correlated with the selected position by mapping engine 410 through links 414.

In one embodiment of the invention, map 412 contains a number of positions corresponding to the number of positions in patient data space coordinate system 416 detectable by a surgical navigation system (see, e.g., U.S. Pat. No. 5,383,454). A map position is selected according to the location of a surgical probe in patient data space coordinate system 416 during a medical procedure. For example, during neurosurgery a surgeon placing the probe at a patient's ventricle activates a map position corresponding to the probe position in the ventricle. The activated map position is communicated to mapping engine 410 which queries co-registered databases 400 for data corresponding to the map position in the ventricle. This corresponding co-registered data is deformed to fit the patient's anatomy and combined with patient specific data giving the surgeon composite data related to the patient's ventricle, containing more information than the patient data alone.

Figure 5:
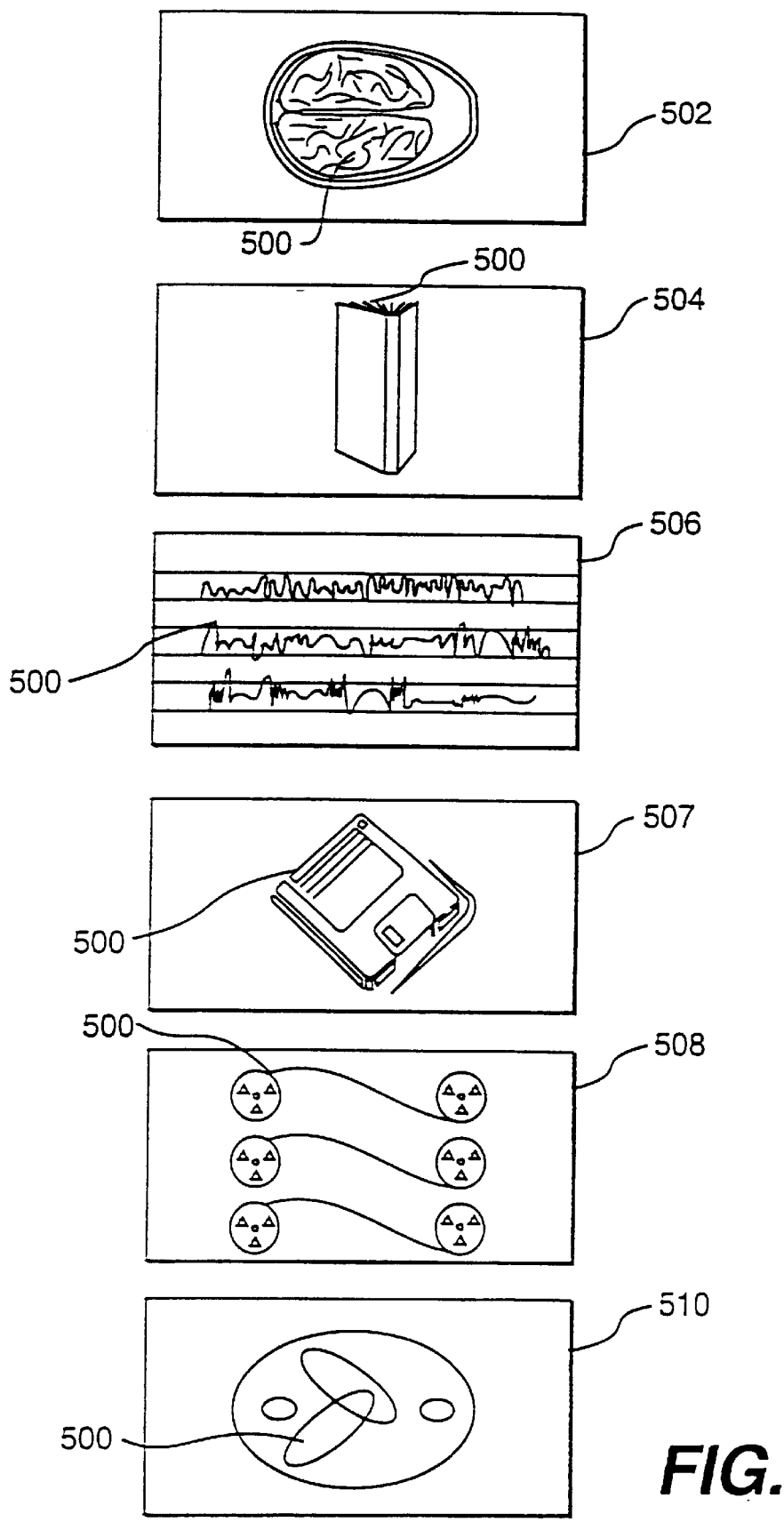
FIG. 5 is an illustration of co-registered medical data used in an embodiment of the present invention consistent with the block diagram of FIG. 2.

A further illustration of the types of data a physician may require during neurosurgery or during surgical planning is shown in FIG. 5. This figure contains illustrations of six data types available to a surgeon in an embodiment of the present invention including a cross-sectional image 502, a medical journal article 504, electroencephalograph waveforms 506, computer programs 507, video images of the brain 508, and a segmentation map identifying the different regions of the brain 510. Because these data sources have been co-registered to a common atlas coordinate system, a point, such as point 500 in the cerebellum in brain image 502 from database 408, has a corresponding point in each of the other data types in co-registered database 400. For example, a point 500 in text database 404 corresponds to article 504 on new surgical techniques involving the cerebellum. Point 500 in waveform database 400 corresponds to recorded waveforms 506 produced by the brain at this location. Point 500 in program database 407 corresponds to applet program 507, which is used to enhance visualization of brain image 502. Point 500 in video database 402 corresponds to video clips 508 of the brain at this location. Point 500 in segmentation map database 409 corresponds to a point within segmentation map 510.

Each of these examples of data need not be acquired from the patient currently receiving treatment. For example, the data may come from digital anatomical atlases, libraries of cadaver images, or research databases produced by projects such as the "Visible Human" research sponsored by the National Library of Medicine. Data available in a co-registered database would include, for example:

1. Anatomic

Magnetic Resonance Imaging

Computer Technology

Magnetic Resonance Angiography

Ultra-Sound

Slice photographic images

Sulci/Gyri traces

2. Functional

Positron Emission Tomography

Single Photon Emission Computer Tomography

Functional Magnetic Resonance images

Electroencephalograph

Magnetoencephalography

3. Symbolic

Structure name

Structure size

Structure function

Structure related text cues

Structure related video cues

Structure related audio cues

Structure related labels

Histology

Morphological data

4. Multimedia

Video Footage of procedures

Training Videos

Conference, Journal Articles

Statistics

5. Computer Programs

Applets

Data Analysis

Automated Structural Segmentation

Image Enhancement and Visualization

These data need not be located in a single database. One of ordinary skill in the art will recognize that individual co-registered databases may be distributed among several databases accessible through, for example, local area computer networks or wide area computer networks connecting local and distributed computers. The combination of the different data components of the co-registered databases produces a generic data model of human anatomy where each data element is correlated through a common coordinate system with corresponding data elements of other types. When planning or providing medical treatment, the invention produces composite data linking co-registered data of a generic model to the specific anatomy of a patient receiving treatment. Examples of other embodiments consistent with the present invention for producing composite data for medical diagnosis, planning, and treatment include, but are not limited to, the following.

1. Diagnostic Radiology—co-registered patient magnetic resonance, X-ray, and/or computed tomography imagery are linked to text data such as radiologists's reports, patient case history files, and relevant conference/journal articles. Sequential scans of a patient are co-registered for tracking the growth or reduction of lesions. Data analysis programs are linked to the composite data for computation of quantitative data measurements for planning and monitoring of treatment progress. Co-registered multimodal patient image data and relevant co-registered data are presented in a common, easy-to-use presentation scheme.
2. Radiation Treatment Planning—Three-dimensional segmented atlases are mapped to patient data to produce an object-based model of lesions, targets, and major organs and other critical structures. The patient data with associated object information is utilized by a treatment planning program for computing optimized radiation delivery strategies from target and critical structure information.
3. Neurosurgical Targeting—cranial patient imagery is mapped to neurosurgical atlas information containing coordinates and shapes of surgical targets and surrounding neuroanatomic structures. Structural information is linked to audio files for use in-surgery with microrecording probes. Links to statistical databases provide information relating regions of interest to procedures and success rates.

Figure 6:
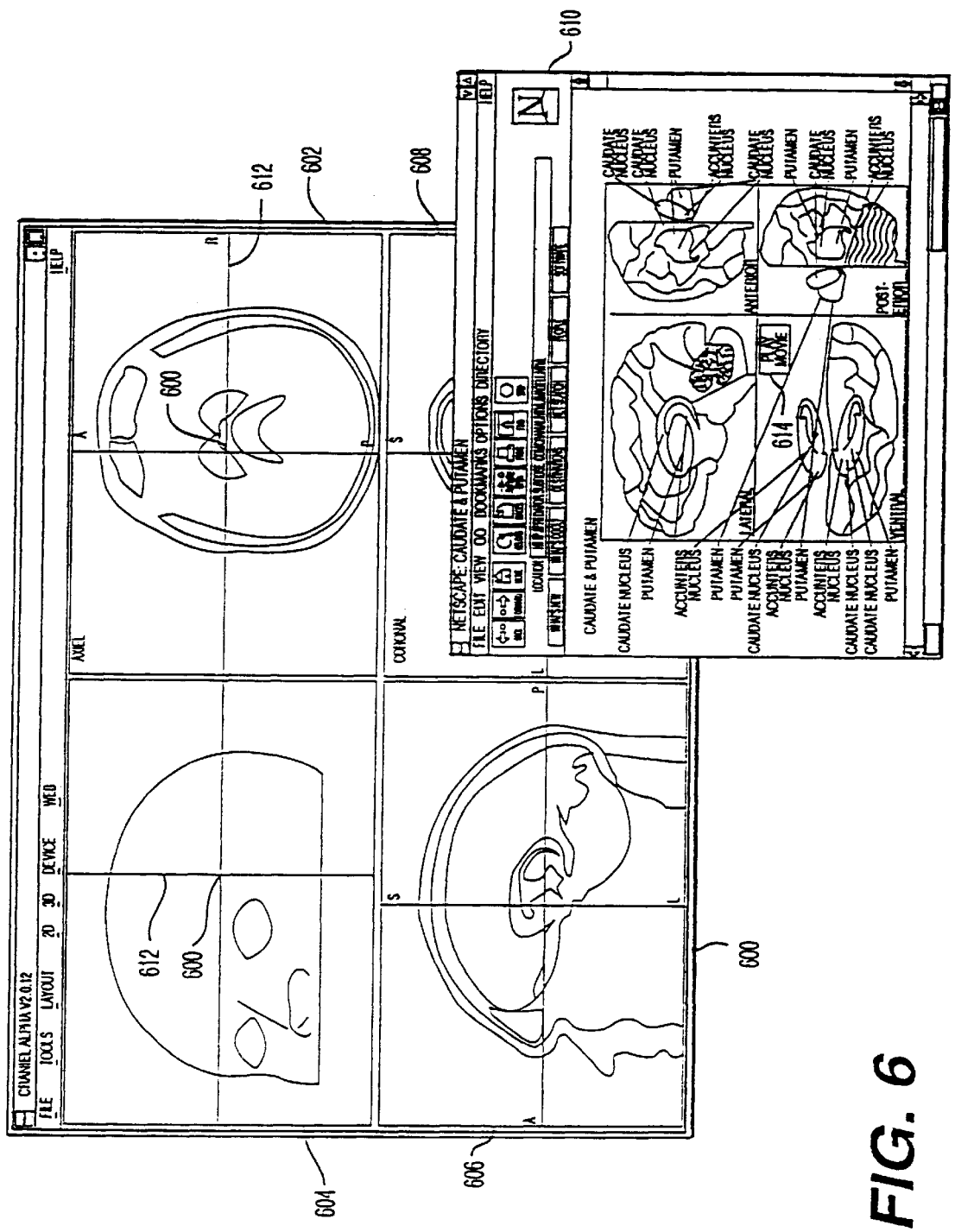
FIG. 6 is a display produced in accordance with the embodiment of the present invention shown in the block diagram of FIG. 2.

FIG. 6 shows how one embodiment of the present invention presents composite data to an operator on a computer display having several windows. Window 604 contains patient data in the form of a three-dimensional MR brain scan. Windows 602, 606 and 608 contain axial sagittal, and coronal photographic section data, respectively, from the Visible Human data set, which are co-registered to the patient data by deformation engine 204. Window 610 presents co-registered atlas data to an operator. By positioning cross-hairs 612 in Window 604 at a desired point 600, the corresponding point 600 in each of the images in windows 602, 606, and 608 is identified automatically by the location of cross-hairs in those windows. Here, for example, the operator selected point 600 in window 604 corresponding to a region of the brain known as the putamen. Atlas data containing views of the putamen are displayed in window 610 with highlighted pointers indicating the putamen in each of the atlas images. The operator can also choose to play a movie showing video images of the putamen by pushing "play movie" button 614. Alternatively the operator may select the word "putamen" in window 610 and cross-hairs 612 will indicate the position of the putamen in patient data window 604 and the Visible Human "atlas" data windows 602, 606, 608.

Figure 7:
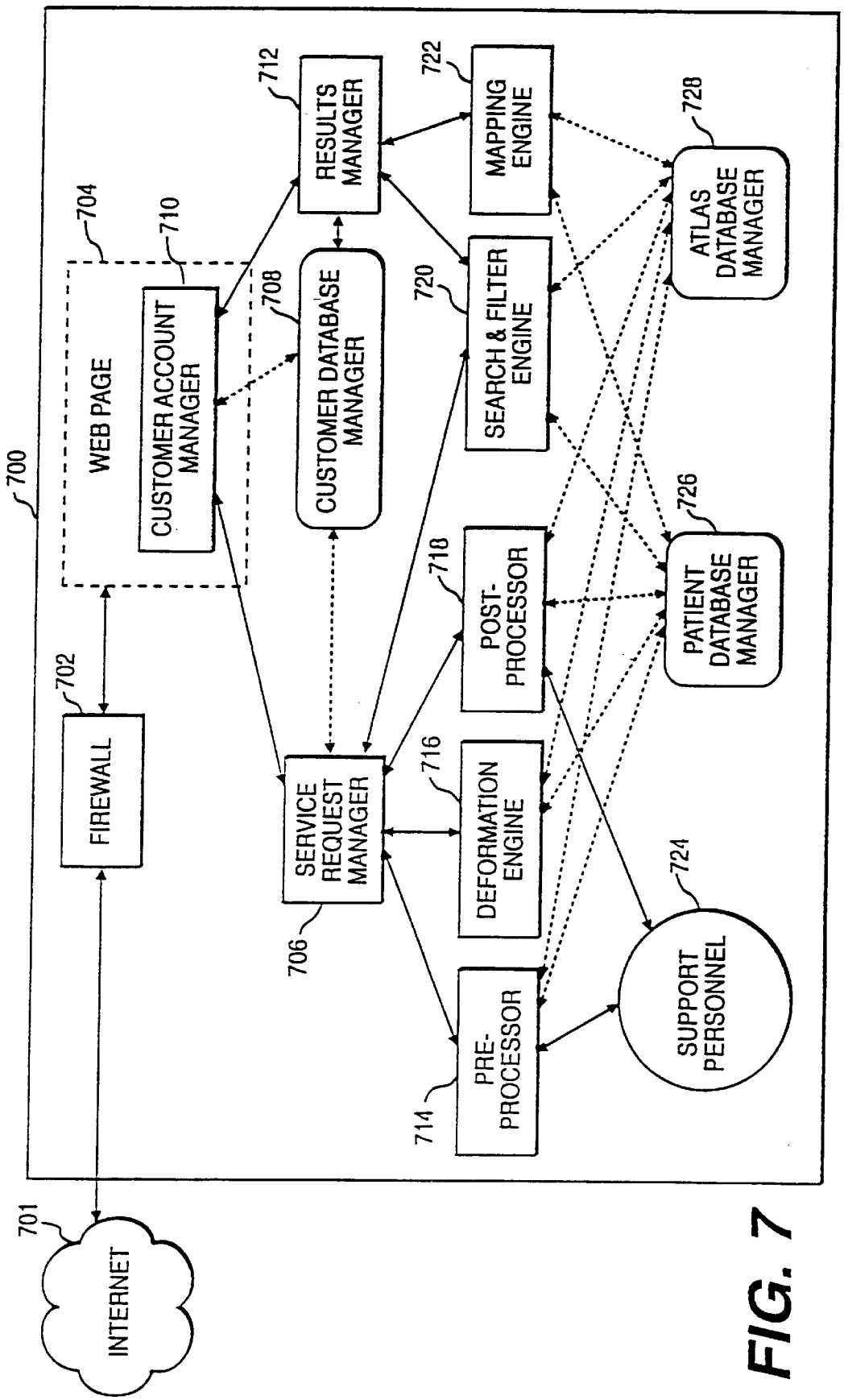
FIG. 7 is a block diagram of a facility for providing composite data in accordance with an embodiment of the present invention.

FIG. 7 is a block diagram of a facility consistent with the present invention for providing composite data across a computer network to consumers under a service contract. In FIG. 7, solid lines indicate a path for both control and data flow and dotted lines indicate data flow only. Facility 700 is preferably connected to a wide area network, such as Internet 701, through firewall 702. Firewall 702 is a computer that monitors all data traffic into and out of facility 700 to prevent unauthorized access to the facility. World Wide Web page 704 provides a graphical user interface to access facility 700. Facility 700 also includes customer account manager 710, which controls functions available to customers with service contracts authorizing access to facility 700.

User login authentication is performed by customer account manager 710 and control is passed to one of three processes, service request manager 706, customer database manager 708, or results manager 712 depending on the service that the customer chooses. Customers that wish to initiate a new request for composite data are passed to service request manager 706. After successful completion of a composite data request, the customer's account is billed and the status of any pending requests is provided. Customers that wish to view the composite data generated in response to the request are passed to results manager 712. Information pertaining to a customer's account (e.g., billing information, changing passwords, user preferences, etc.) may be obtained by submitting queries to customer database manager 708.

Service request manager 706 initiates service requests and controls the computational operations required for anatomic mapping. The progress of a service request is tracked and reported to customer account manager 710. Customer database manager 708 administers a database that contains customer account data (not shown). Customer database manager 708 is responsible for controlling and backing up the customer database and it also processes queries from customer account manager 710, service request manager 706, and results manager 712. Results manager 712 integrates the results generated by service request manager 706 with context-specific medical knowledge. Results manager 712 receives information from search and filter engine 720 and mapping engine 722 specific to application requirements. Some results may be provided as visual representations (e.g., mapped segmented structures in a brain image) while others may be expressed in numeric form (e.g., coordinates of a neurosurgical target).

Processor 714 checks patient data associated with a server request to make sure that the patient data is in the correct format and that the service request is appropriate. Support personnel 724 confirm the check performed by preprocessor 714. Any inconsistencies or anomalies that are found are reported to service request manager 706. Similarly, post processor 718 checks the results of a service request. Support personnel 724 confirm the check performed by postprocessor 718. Any inconsistencies or anomalies that are found are reported to service request manager 706.

Facility 700 also includes deformation engine 716, search and filter engine 720, and mapping engine 722. Deformation engine 716 computes atlas-to-patient transformations requested by service request manager 706. Search and filter engine 720 processes customer, patient, and procedure contextual data and integrates relevant atlas information according to application requirements. Both results manager 712 and service request manager 706 initiate search and filter engine 720 operations. Following a request from results manager 712, mapping engine 722 applies the results of the deformation process mapping an atlas to the patient data.

Patient database manager 726 administers a database that contains patient data and corresponding transformation computed by deformation engine 716. Patient database manager 726 serves queries from deformation engine 716, search and filter engine 720, and mapping engine 722 and is also responsible for controlling and backing up the patient database (not shown).

Atlas database manager 728 administers a database that contains the atlas data (not shown). Atlas database manager 723 serves queries from deformation engine 716, search and filter engine 720, and mapping engine 722 and is also responsible for controlling and backing up the atlas database. Atlas database manager 728 can also perform and/or manage the indexing of the co-registered data databases.

While there has been illustrated and described what are at present considered to be preferred embodiments and methods of the present invention, persons skilled in the art will understand that various changes and modifications may be made, and equivalents may be substituted without departing from the scope of the invention.

In addition, many modifications may be made to adapt a particular element, technique or implementation to the teachings of the present invention without departing from the central scope of the invention. For example, disclosed elements may be implemented in hardware, computer program code, or a combination of both hardware and computer program code. Moreover, elements depicted and described separately may be combined and implemented in a single element. Therefore, this invention is not limited to the particular embodiments and methods disclosed, but includes all embodiments falling within the scope of the appended claims.

We claim:

1. A method for presenting an operator with composite medical data containing subject data and co-registered data representing a knowledge base providing supplemental information about structure contained in the subject data, said method comprising:

creating a mapping relationship between the subject data and the co-registered data by deforming a template corresponding to the subject data;

linking, based on the mapping relationship, co-registered data in co-registered databases that include dose curve data and medical atlas data;

filtering the co-registered data to allow mapping of at least a portion of the co-registered data;

mapping the filtered co-registered data to the subject data according to the mapping relationship to produce the composite data; and presenting the operator the composite medical data including the dose curve data and medical atlas data.

2. The method of claim 1, wherein the step of linking the medical atlas data to the dose curve data includes co-registering the dose curve data and the medical atlas data to a common atlas coordinate system.

3. The method of claim 1, wherein the dose curve data is a graphical representation of computed dosages.

4. The method of claim 1, wherein the dose curve data is a graphical representation of calculated therapy settings.

5. The method of claim 1, wherein the step of mapping includes the step of relating a point in a subject data space coordinate system to an element of co-registered data.

6. The method of claim 1, wherein the presenting step includes displaying the composite medical data as a VRML display.

7. The method of claim 1, wherein the step of presenting the composite medical data includes composing the composite medical data on a server computer and transmitting the composite medical data to a client computer for presentation to the operator.

8. An apparatus for presenting an operator with composite medical data containing subject data and co-registered data representing a knowledge base providing supplemental information about structure contained in the subject data, said apparatus comprising:

a deformation engine that creates a mapping relationship between co-registered data, in co-registered databases, and subject data by deforming a template corresponding to the subject data;

links that, based on the mapping relationship, specify a relationship in co-registered databases that include medical atlas data and dose curve data;

a filtering engine that filters the co-registered data to allow mapping of at least a portion of the co-registered data;

a mapping engine that maps the filtered co-registered data according to the mapping relationship to produce the composite medical data; and a graphical display that presents to the operator the composite medical data, including the dose curve data and the medical atlas data.

9. The apparatus of claim 8, wherein the links are created by co-registering the dose curve data and the medical atlas to a common atlas coordinate system.

10. The apparatus of claim 8, wherein the dose curve data is a graphical representation of computed dosages.

11. The apparatus of claim 8, wherein the dose curve data is a graphical representation of calculated therapy settings.

12. The apparatus of claim 8, wherein the graphical display is located at a client computer and the composite medical data is composed on a server computer and transmitted to the client computer for presentation to the operator.

13. The apparatus of claim 8, wherein the graphical display presents the dose curve data and the medical atlas data as a VRML image.

14. An apparatus for presenting an operator with composite medical data containing subject data and co-registered data representing a knowledge base providing supplemental information about structure contained in the subject data, and apparatus comprising:

a deformation engine that creates a mapping relationship between the subject data and the co-registered data, in co-registered databases, by deforming a template corresponding to the subject data;

a filtering engine that filters the co-registered data corresponding to a map position supplied by a surgical navigation system to allow at least a portion of the corresponding co-registered data to be mapped;

a mapping engine that maps the filtered co-registered data corresponding to the map position to the subject data according to the mapping relationship to produce the composite medical data; and a display that presents the operator with the composite medical data composed of the corresponding co-registered data mapped to the subject data.

15. The apparatus of claim 14, wherein the surgical navigation system selects the map position based on a location of a surgical probe in a subject space.

16. The apparatus of claim 14, wherein the display presents the composite medical data as an image.

17. The apparatus of claim 14, wherein the display presents the composite medical data as text.

18. The apparatus of claim 14, wherein the display presents the composite medical data as a VRML image.

19. An method for presenting an operator with composite medical data containing subject data and co-registered data representing a knowledge base providing supplemental information about structure contained in the subject data, said method comprising:

creating a mapping relationship between the subject data and the co-registered data, in co-registered databases, by deforming a template corresponding to the subject data;

filtering the co-registered data corresponding to a map position supplied by a surgical navigation system to allow at least a portion of the corresponding co-registered data to be mapped;

mapping the filtered co-registered data corresponding to the map position to the subject data according to the mapping relationship to produce the composite medical data; and displaying to an operator a representation of the composite medical data composed of the co-registered corresponding data mapped to the subject data.

20. The method of claim 19, wherein supplying the map position includes the surgical navigation system selecting a map position based on a location of a surgical probe in a subject space.

21. The method of claim 19, wherein the displaying step includes presenting the composite medical data as an image.

22. The method of claim 19, wherein the displaying step includes presenting the composite medical data as text.

23. The method of claim 19, wherein the displaying step includes presenting the composite medical data as a VRML image.

24. An apparatus for presenting an operator with composite medical data containing subject data and co-registered data representing a knowledge base providing supplemental information about structure contained in the subject data, said apparatus comprising:

means for creating a mapping relationship between the subject data and the co-registered data, in co-registered databases, by deforming a template corresponding to the subject data;

means for filtering the co-registered data corresponding to a map position supplied by a surgical navigation system to allow at least a portion of the corresponding co-registered data to be mapped;

means for mapping the filtered co-registered data corresponding to the map position to the subject data according to the mapping relationship to produce the composite medical data; and means for presenting the operator with composite medical data composed of the corresponding co-registered data mapped to the subject data.

25. The apparatus of claim 24, wherein the means for filtering comprises means for use with a surgical navigation system for selecting the map position based on a location of a surgical probe.

26. The apparatus of claim 24, wherein the means for presenting the composite medical data comprises means for displaying the composite medical data image.

27. The apparatus of claim 24, wherein the means for presenting composite medical data comprises means for displaying the composite medical data as a VRML image.

28. The method of claim 24, wherein the means for presenting the composite medical data comprises means for displaying the composite medical data as text.

29. An apparatus for tracking change of brain structures and lesions with composite medical data, comprising:

a deformation engine that creates a mapping relationship between scans of a subject's brain structures and lesions and subject data by deforming a template corresponding to the subject data;

a filtering engine that filters the scans to allow the mapping of at least a portion of the scans to the subject data;

a mapping engine that maps the scans that have been filtered to the subject data to form the composite medical data; and a graphical display that presents the composite medical data composed of the scans of the subject's brain structures and lesions, and the subject data.

30. The apparatus of claim 29, wherein the scans are sequential scans of a subject's brain structure and lesions.

31. The apparatus of claim 29, wherein the mapping engine produces the composite medical data by relating points in a subject space coordinate system to scans in a co-registered database coordinate system.

32. The apparatus of claim 29, wherein the graphical display presents the composite medical data to the operator as a VRML image.

33. An apparatus for tracking change of brain structures and lesions with composite medical data, comprising:

means for creating a relationship between scans of a subject's brain structures and lesions and subject data by mapping or deforming a template corresponding to the subject data;

means for filtering the scans to allow at least a portion of the scans to be mapped to the subject data;

means for mapping the scans that have been filtered to the subject data to form the composite medical data; and means for displaying the composite medical data composed of the scans of the subject's brain structures and lesions, and the subject data.

34. The apparatus of claim 33, wherein the means for creating the mapping relationship comprises means for creating the mapping relationship between sequential scans of the subject's brain structures and lesions and the subject data.

35. The apparatus of claim 33, wherein the means for mapping the scans comprises means for producing the composite medical data by relating points in a subject space coordinate system to the scans in a co-registered database coordinate system.

36. The apparatus of claim 35, wherein the means for displaying includes means for presenting the composite medical data to the operator as a VRML image.

37. A method for change of brain structures and lesions with composite medical data, comprising:

creating a relationship between scans of a subject's brain structures and lesions and the subject data by mapping or deforming a template corresponding to the subject data;

filtering the scans to allow the mapping of at least a portion of the scans to the subject data;

mapping the scans that have been filtered to the subject data to form the composite medical data; and displaying the composite medical data composed of the scans of the subject's brain structures and lesions, and the subject data.

38. The method of claim 37, wherein the relationship is created between sequential scans of the subject's brain structures and lesions and the subject data.

39. The method of claim 37, wherein the mapping step includes forming the composite medical data by relating points in a subject space coordinate system to the scans in a co-registered database coordinate system.

40. The method of claim 37, wherein the displaying step includes representing the composite medical data to the operator as a VRML image.

41. An apparatus for linking a region of interest in a subject data set to a statistical database that relates the region of interest to information on procedures, comprising:

a deformation engine that creates a mapping relationship between the statistical database and the subject data set by deforming a template corresponding to the subject data set;

a filtering engine that filters the statistical database to allow at least a portion of the statistical database to be mapped to the subject data;

a mapping engine that maps the filtered statistical database, which contains the information on procedures, to the subject data to form the composite medical data; and a display that presents the composite medical data composed of the subject data and information on procedures.

42. The apparatus of claim 41, wherein the procedure includes the use of electrodose settings.

43. The apparatus of claim 41, wherein the display presents the composite medical data composed of the subject data and information on procedures as text and a VRML image.

44. The apparatus of claim 41, wherein the mapping engine forms the composite medical data by relating points in a subject space coordinate system to the statistical database in a co-registered database coordinate system.

45. The apparatus of claim 41, wherein the display presents the composite medical data as graphics and text.

46. An apparatus for linking a region of interest in subject data to a statistical database that relates the region of interest to information on procedures, comprising:

means for creating a mapping relationship between the statistical database and the subject data;

means for filtering the statistical database to allow at least a portion of the statistical database to be mapped to the subject data;

means for mapping the filtered statistical database, which contains the information on procedures, to the subject data to form the composite medical data; and means for presenting the composite medical data composed of the subject data and information on procedures.

47. The apparatus of claim 46, wherein the means for presenting includes means for presenting a procedure that uses electrodose settings.

48. The apparatus of claim 46, wherein the means for mapping includes means for forming the composite medical data by relating points in a subject space coordinate system to the statistical database in a co-registered database coordinate system.

49. The apparatus of claim 46, wherein the means for presenting includes means for displaying the composite medical data as graphics and text.

50. The apparatus of claim 46, wherein the means for presenting includes means for displaying the composite medical data as a VRML image and text.

51. A method for linking a region of interest in subject data to a statistical database that relates the region of interest to information on procedures, comprising:

creating a mapping relationship between the statistical database and a subject data set by deforming a template corresponding to the subject data;

filtering the statistical database to map at least a portion of the statistical database to the subject data set;

mapping the filtered statistical database, which contains the information on procedures, to the subject data to form the composite medical data; and presenting the composite medical data composed of the subject data and information on procedures that correspond with a selected point.

52. The method of claim 51, wherein the step of presenting includes displaying a procedure that uses electrodose settings.

53. The method of claim 51, wherein the step of mapping includes forming the composite medical data by relating points in a subject space coordinate system to the statistical database in a co-registered database coordinate system.

54. The apparatus of claim 51, wherein the step of presenting includes displaying the composite medical data as graphics and text.

55. The apparatus of claim 51, wherein the step of presenting includes displaying the composite medical data as a VRML image and text.

56. An apparatus for creating an object based model of an area of interest within a subject, comprising:

a deformation engine that creates a mapping relationship between segmented atlases of a plurality of dimensions and a subject data set by deforming a template corresponding to the subject data set;

a filtering engine that filters the segmented atlases to allow at least a portion of the segmented atlases to be mapped to the subject data set;

a mapping engine that maps the segmented atlases that have been filtered to the subject data set to form the composite medical data, which includes the object based model; and a display that presents the composite medical data composed of the object based model of the area of interest.

57. The apparatus of claim 56, wherein the object based model of the area of interest is a representation of one of lesions, targets, and brain structures.

58. The apparatus of claim 56, wherein the display presents the composite medical data composed of the object based model of the area of interest displayed as a graphical image.

59. The apparatus of claim 56, wherein the display represents the composite medical data composed of the object based model of the area of interest displayed as a VRML image.

60. A method for creating an object based model of an area of interest within a subject, comprising:

creating a relationship between segmented atlases of a plurality of dimensions and a subject data set by deforming a template corresponding to the subject data set;

filtering the segmented atlases to allow at least a portion of the segmented atlases to be mapped to the subject data set;

mapping the segmented atlases that have been filtered to the subject data set to form the composite medical data, which includes the object based mode; and displaying the composite medical data composed of the object based model of the area of interest.

61. The method of claim 60, wherein the displaying step includes a graphic representation of the object based model of one of lesions, targets, and brain structures.

62. The method of claim 60, wherein the displaying step includes a VRML image of the object based model of one of lesions, targets, and brain structures.

63. An apparatus for creating an object based model of an area of interest within a patient said apparatus for use with one or more co-registered databases representing a knowledge base providing supplemental information about structure contained in the subject data, said apparatus comprising:

means for creating a relationship between segmented atlases of a plurality of dimensions and a subject data set by deforming a template corresponding to the subject data set;

means for filtering the segmented atlases to allow at least a portion of the segmented atlases to be mapped to the subject data set;

means for mapping the segmented atlases that have been filtered to the subject data set to form the composite medical data, which include the object based model; and means for displaying the composite medical data composed of the object based model of the area of interest.

64. The apparatus of claim 63, wherein the means for displaying includes means for providing a graphic representation of the object based model of one of lesions, targets, and brain structures.

65. The apparatus of claim 63, wherein means for displaying include means for providing a VRML image of the object based model of one of lesions, targets, and brain structures.

66. An apparatus that uses composite medical data to supply a navigation system with a surgical plan, said apparatus for use with one or more co-registered databases representing a knowledge base providing supplemental information about structure contained in the subject data, said apparatus comprising:

a deformation engine that creates a relationship between segmented atlases of a plurality of dimensions and a subject data set by deforming a template corresponding to the subject data set;

a mapping engine that receives a map position from the navigation system and queries at least one of the co-registered databases for data corresponding to the map position and supplies the data corresponding to the map position to the navigation system.

67. The apparatus of claim 66, wherein the mapping engine supplies a surgical plan to the navigation system based on atlas information.

68. An apparatus that uses composite medical data to supply a navigation system with a surgical plan, said apparatus for use with one or more co-registered databases representing a knowledge base providing supplemental information about structure contained in the subject data, said apparatus comprising:

means for creating a relationship between segmented atlases of a plurality of dimensions and a subject data set by deforming a template corresponding to the subject data set;

means for receiving a map position from the surgical navigation system and querying at least one of the co-registered databases for data corresponding to the map position; and means for supplying the data corresponding to the map position to the navigation system.

69. The apparatus of claim 68, wherein the means for supplying include means for providing a surgical plan to the navigation system based on atlas information.

70. An apparatus that in conjunction with a navigation system presents an operator with composite medical data containing subject data and co-registered data representing a knowledge base providing supplemental information about structure contained in the subject data, said apparatus comprising:

a deformation engine that creates a relationship between the subject data and the co-registered data, in at least one co-registered database, by deforming a template corresponding to the subject data;

a mapping engine that receives a map position from the navigation system and queries the at least one co-registered database for data corresponding to the map position;

a filtering engine that filters the data corresponding to the map position to allow at least a portion of the corresponding data to be mapped to the subject data; and a display on the navigation system that presents the operator with the composite medical data composed of the corresponding data mapped to the subject data.

71. The apparatus of claim 70, wherein the display is a VRML display.

72. The apparatus of claim 70, wherein the display is a graphical display.

73. The apparatus of claim 70, wherein the display on the navigation system only displays the boundaries of an atlas found in the at least one co-registered database.

74. A method for presenting composite medical data containing subject data and co-registered data representing a knowledge base providing supplemental information about structure contained in the subject data on a navigation system, said method comprising:

generating a relationship between the subject data and the co-registered data, in at least one co-registered database, by deforming a template corresponding to the subject data;

receiving a map position from the navigation system and querying the at least one co-registered database for data corresponding to the map position;

filtering the data corresponding to the map position to allow at least a portion of the corresponding data to be mapped to the subject data; and presenting on the navigation system composite medical data composed of the corresponding data mapped to the subject data.

75. The method of claim 74, wherein the step of presenting includes displaying the composite medical data as a VRML display.

76. The method of claim 74, wherein the step of presenting includes displaying the composite medical data as a graphical display.

77. The method of claim 74, wherein the step of presenting includes only displaying on the navigation system the boundaries of an atlas found in the at least one co-registered database.

78. An apparatus that in conjunction with a navigation system presents an operator with composite medical data containing subject data and co-registered data representing a knowledge base providing supplemental information about structure contained in the subject data, said apparatus comprising:

means for creating a relationship between the subject data and the co-registered data, in at least one co-registered database, by deforming a template corresponding to the subject data;

means for receiving a map position from the navigation system and querying the at least one co-registered database for data corresponding to the map position;

means for filtering the data corresponding to the map position to allow at least a portion of the corresponding data to be mapped to the subject data; and means for presenting on the navigation system composite medical data composed of the corresponding data mapped to the subject data.

79. The apparatus of claim 78, wherein the means for presenting includes means for displaying the composite medical data as a VRML display.

80. The apparatus of claim 78, wherein the means for presenting includes means for displaying the composite medical data as a graphical display.

81. The apparatus of claim 78, wherein the means for presenting includes means for only displaying on the navigation system the boundaries of an atlas found in the at least one co-registered database.

82. An apparatus for automatically presenting an operator with composite medical data containing patient data and co-registered data representing a knowledge base providing supplemental information about structure contained in the patient data, said apparatus comprising:
- means for requesting composite medical data from a server computer;
- means for transmitting the patient data to the server computer;
- means for transmitting the requested composite medical data from the server computer; and
- means including a surgical navigation system for presenting the received composite medical data to an operator.

83. An apparatus for automatically presenting an operator with composite medical data containing patient data and co-registered data representing a knowledge base providing supplemental information about structure contained in the patient data, said apparatus comprising:
- means including a surgical navigation system for requesting composite medical data from a server computer;
- means for transmitting that patient data to the server computer;
- means for transmitting the requested composite medical data from the server computer; and
- means for presenting the received composite medical data to an operator.

84. A method for automatically producing composite data containing subject data and co-registered data representing a knowledge base providing supplemental information about structure contained in the subject data, said method comprising the steps, performed in a computer having a mapping engine, a search and filter engine, and a deformation engine, of:
- creating a mapping relationship between the co-registered data and the subject data by deforming a template to fit the subject data;
- filtering the co-registered data; and
- mapping the filtered co-registered data to the subject data according to the mapping relationship to produce the composite data.

85. The method of claim 84, wherein the co-registered data contains co-registered subject data.

86. The method of claim 84, wherein the step of mapping includes the substep of relating a point in a subject data space coordinate system to an element of co-registered data.

87. The method of claim 84, wherein the step of mapping includes the substep of relating an element of co-registered data to a point in a subject data space coordinate system.

88. The method of claim 84, further comprising the step of receiving a request for the composite data from an operator.

89. The method of claim 88, further comprising the step of processing said request using a filtering context for the composite data.

90. The method of claim 84, further comprising the step of communicating the composite data to a display on the computer.

91. The method of claim 84, further comprising the step of generating a map representing the relationship between the subject data and the co-registered data with the computer.

92. The method of claim 84, further comprising the step of filtering the co-registered data according to a filtering context.

93. A computer having a mapping engine, a deformation engine, and a search and filter engine for automatically producing a composite medical data containing subject data and co-registered medical data representing a knowledge base providing supplemental information about structure contained in the subject data, said computer comprising:
- means for creating a mapping relationship between the co-registered medical data and the subject data by mapping or deforming a template to fit the subject data;
- means for filtering the co-registered medical data;
- means for mapping the filtered co-registered medical data to the subject data according to the mapping relationship to produce the composite medical data.

94. The computer of claim 93, wherein the co-registered medical data contains co-registered subject data.

95. The computer of claim 93, wherein the means for creating a mapping relationship comprises means for relating a point in a subject data space coordinate system to an element of co-registered medical data.

96. The computer of claim 93, wherein the means for mapping further comprises means for relating an element of co-registered medical data to a point in a subject data space coordinate system.

97. The computer of claim 93, further comprising means for receiving a request for the composite medical data from an input device.

98. The computer of claim 93, further comprising means for processing a filtering context; and
means for processing a request, including a filtering context, for the composite medical data.

99. The computer of claim 93, further comprising means for displaying the composite medical data to an operator.

100. The computer of claim 93, further comprising means for communicating a map representing the relationship between the subject data and the co-registered medical data to an operator using the computer.

101. The computer of claim 93, wherein the means for producing composite medical data comprises means for filtering the co-registered medical data according to a filtering context.

* * * * *

UNITED STATES PATENT AND TRADEMARK OFFICE
CERTIFICATE OF CORRECTION

PATENT NO. : 6,526,415 B2
DATED : February 25, 2003
INVENTOR(S) : Smith et al.

It is certified that error appears in the above-identified patent and that said Letters Patent is hereby corrected as shown below:

Title page,
Item [54], the title, "METHOD AND APPARATUS FOR PRODUCING AN ACCESSING COMPOSITE DATA" should read -- METHOD AND APPARATUS FOR PRODUCING AND ACCESSING COMPOSITE DATA --

Column 1,
Line 14, "data Medical" should read -- data. Medical --
Line 20, "allow then to use" should read -- allow them to use --

Column 2,
Line 45, "assimilate composite data" should read -- assimilated composite data --
Line 61, "server, computer;" should read -- server computer; --

Column 3,
Line 28, "principled of the invention." should read -- principles of the invention --

Column 4,
Line 53, "all of a subset" should read -- all or a subset --

Column 5,
Line 34, "filtering content" should read -- filtering context --
Line 44, "structure in a region" should read -- structures in a region --

Column 6,
Line 1, "data providing by" should read -- data provided by --
Line 30, "hyperintense of T2" should read -- hyperintense on T2 --
Line 40, "in that art" should read -- in the art --
Line 55, "program" should read -- program --
Line 57, "operator instruction" should read -- operator interaction --

Column 8,
Line 4, "waveform database 400" should read -- waveform database 406 --
Line 21, "Computer Technology" should read -- Computed Tomography --
Line 30, "Computer Tomography" should read -- Computed Tomography --

UNITED STATES PATENT AND TRADEMARK OFFICE
CERTIFICATE OF CORRECTION

PATENT NO. : 6,526,415 B2
DATED : February 25, 2003
INVENTOR(S) : Smith et al.

It is certified that error appears in the above-identified patent and that said Letters Patent is hereby corrected as shown below:

Column 9,
Line 38, "axial sagittal," should read -- axial, sagittal, --
Line 60, "consumers" should read -- customers --

Column 10,
Line 59, "transformation" should read -- transformations --
Lines 66-67, "Atlas database manager 723" should read -- Atlas database manager 728 --

Column 12,
Line 15, "atlas to" should read -- atlas data to --
Line 32, "and apparatus" should read -- said apparatus --
Line 57, "An method" should read -- A method --

Column 13,
Line 45, "data image." should read -- data as an image. --

Column 14,
Line 2, "structure" should read -- structures --
Line 32, "claim 35" should read -- claim 33 --
Line 35, "for change" should read -- for tracking change --

Column 16,
Line 46, "mode; and" should read -- model; and --

Column 17,
Lines 15 and 33, "navigation" should read -- navigational --

Column 19,
Line 22, "transmitting that patient data" should read -- transmitting the patient data --

UNITED STATES PATENT AND TRADEMARK OFFICE
CERTIFICATE OF CORRECTION

PATENT NO. : 6,526,415 B2
DATED : February 25, 2003
INVENTOR(S) : Smith et al.

It is certified that error appears in the above-identified patent and that said Letters Patent is hereby corrected as shown below:

Column 20,
Line 15, "producing a composite" should read -- producing composite --

Signed and Sealed this

Fourteenth Day of October, 2003

JAMES E. ROGAN
*Director of the United States Patent and Trademark Office*